United States Patent [19]

Yamamoto et al.

[11] Patent Number: 5,796,534
[45] Date of Patent: Aug. 18, 1998

[54] APPARATUS WHICH PERFORMS AN ID OPERATION SIMULTANEOUSLY WITH A SERVO OPERATION USING A DATA RECORDING MEDIUM WITH THE ID AREA RECORDED IMMEDIATELY BEFORE THE SERVO AREA

[75] Inventors: Noriyuki Yamamoto, Tokyo; Hiroaki Yada, Kanagawa; Nobuhiro Hayashi, Kanagawa; Takamichi Yamakoshi, Kanagawa, all of Japan

[73] Assignee: Sony Corporation, Tokyo, Japan

[21] Appl. No.: 543,498

[22] Filed: Oct. 16, 1995

Related U.S. Application Data

[63] Continuation of Ser. No. 144,970, Oct. 28, 1993, abandoned.

[30] Foreign Application Priority Data

Oct. 30, 1992 [JP] Japan ............................... 4-316636

[51] Int. Cl.$^6$ ............................................. G11B 5/02
[52] U.S. Cl. .................................... 360/48; 360/50
[58] Field of Search ......................... 360/48, 77.08, 360/135, 50, 51

[56] References Cited

U.S. PATENT DOCUMENTS

| | | | |
|---|---|---|---|
| 5,073,834 | 12/1991 | Best et al. | 360/77.08 |
| 5,235,478 | 8/1993 | Hoshimi et al. | 360/77.08 |
| 5,278,815 | 1/1994 | Mashimo et al. | 360/48 |
| 5,285,327 | 2/1994 | Hetzler | 360/48 |
| 5,293,276 | 3/1994 | Dunn et al. | 360/48 |
| 5,377,178 | 12/1994 | Saito et al. | 360/77.08 |
| 5,477,103 | 12/1995 | Romano et al. | 360/77.08 X |
| 5,526,202 | 6/1996 | Blagaila et al. | 360/77.08 |

*Primary Examiner*—Aristotelis M. Psitos
*Assistant Examiner*—Larry T. Cullen
*Attorney, Agent, or Firm*—Pasquale Musacchio; Jerry A. Miller

[57] ABSTRACT

To increase the recording capacity of a magnetic disc, tracks of this magnetic disc are divided into a number of sectors, with each sector being formed from a number of segments. Each segment is basically made up of a data region and a servo region with data being recorded on the data region and a clock pattern which becomes the basis for generation of a clock, a fine pattern which becomes the basis for the tracking operation, and an access pattern which becomes the basis for a seek operation being recorded on the servo region. An ID region and servo region are formed before the data region and servo region which make up the leading segment with the sector ID for this region being recorded in this ID region. After this ID has been read from this ID region, while it is being determined whether or not this ID is the same as the designated ID, the servo operation corresponding to the servo control signal occurring in the servo region is carried out. In this way, the recording of data corresponding to the data in the data region can commence straight after the ID has been decided upon.

3 Claims, 9 Drawing Sheets

APPARATUS WHICH PERFORMS AN ID OPERATION SIMULTANEOUSLY WITH A SERVO OPERATION USING A DATA RECORDING MEDIUM WITH THE ID AREA RECORDED IMMEDIATELY BEFORE THE SERVO AREA

This is a continuation of application Ser. No. 08/144,970 filed on Oct. 28, 1993 which is hereby incorporated by reference, now abandoned.

BACKGROUND OF THE INVENTION

1. Field of the Invention

The present invention relates to a data recording medium and a data recording playback apparatus suitable for use with, for example, magnetic discs or opto-magnetic discs or for use as their recording/playback apparatus.

2. Description Of The Related Art

FIG. 8 is a view of the basic structure of a magnetic disc. In this diagram, the disc 1 is divided into a number of cake-shaped sectors, with each of these sectors being made up of a number of segments.

FIG. 9 is a view of the sector format. In this diagram, each segment is basically divided up into a data region for storing data and a servo control region for storing a servo control signal. There is also an ID (identification) region at the beginning of the leading segment of each sector for recording the ID for this sector. Also, there is a gap region where nothing is recorded, between the ID region and the data region. The reason for the inclusion of this gap region is that it takes a period of time from reading the ID from the ID region to work out whether or not this is the target sector or not because it has to be determined if this ID coincides with the ID of the sector which is currently being recorded. As there is data recorded in the data region following this ID region it follows that a period of time is required to carry out this identification.

FIG. 10 shows a detailed view of the format of the servo region. In this diagram, the servo region is made up of a clock pattern, an access pattern and a fine pattern. These patterns are formed by removing the unnecessary regions of a magnetic layer 1b which is formed on top of a base 1a by a process such as etching. These patterns can then be magnetized transversally by the application of a direct current.

The clock pattern consists of a single pattern formed continuously along a radial line of the magnetic disc. The position of this clock pattern is then used as the basis for generating clock pulses necessary during recording and playback.

The access pattern is a pattern used for regulating the position of the disc in the radial direction when a seek operation determines that a predetermined track is to be accessed. This length then varies within a predetermined scope of the track.

The fine pattern is the pattern for tracking control. There are four kinds of pattern within the fine pattern, these are X, Y, A and B. Pattern X corresponds to track n and it's corresponding even numbered tracks (track n+/–2, n+/–4), while pattern Y corresponds to the tracks neighboring these tracks (i.e. track n+/–1, n+/–3).

The pattern A is then shifted half a track inwards away from pattern X and pattern B is shifted half a track inwards away from pattern Y.

A gap region where there is no control signal recorded is also formed upstream from the servo region (the left-hand side in FIG. 10) in between a data region and the clock pattern. If, the servo region is reached after data has been recorded in the data region it is necessary to playback the servo control signal recorded in this section. It is therefore necessary to switch over from the recording system to the playback system upon the timing of the change from the data region to the servo region. However, after having switched over to the amplifier for the playback system, it is not possible to go directly to a constant operation as this takes a short period of time. A gap is therefore set up to take into account the period of time it takes for the playback amplifier to be set up.

So, the magnetic disc in the prior art has a gap between the ID region and the data region of the leading segment in a section. Also, in the servo region in each segment, there is also a gap between the data region which is directly behind and the beginning of the servo control signal. These points mean that a large data region cannot be maintained which in turn means that the recording capacity cannot be made large.

According to a first arrangement of the data recording medium in this invention, the sector ID is recorded before the servo control signal. The period of time required to set up the playback amplifier can be acquired when the servo control signal is being read.

According to a second arrangement of the data recording apparatus in this invention, the position control circuit 27 controls the position of the magnetic head 25 while the comparator 47 is reading the ID. This means that the gap after the ID region can be made smaller or can cease to exist completely.

According to a third arrangement of the data recording medium in this invention, the data regions and the servo regions are alternately arranged on the recording medium. Then, a seek control signal such as an access pattern in the form of, for example, a clock pattern for clock generation, for regulating the position of the data recording medium in the radial direction is recorded in the servo region before the servo control signal necessary during the recording and playing back of data. It follows that the gap between the clock pattern and the data region can therefore be made smaller or can be removed completely.

According to a fourth arrangement of the data recording medium in this invention, a synchronization control signal such as a unique pattern is recorded before a servo control signal necessary during the recording and playing back of data such as a clock pattern for clock generation. It follows that the gap region can therefore be made smaller or can be removed completely.

According to a fifth and sixth arrangement of the data recording apparatus in this invention, during the seek operation or during the synchronization operation, the access pattern, unique pattern or the home index pattern is utilized to carry out the seek operation. However, during recording and playback, as these access patterns, unique patterns and home index patterns are not necessary, and tracking control is carried out by detecting the clock pattern which arrives after these. This period of time during which the access pattern exists until the clock pattern is detected can therefore be used as the period of time for the playback system to attain a stable state.

SUMMARY OF THE INVENTION

As this invention sets out to solve the problems encountered in the prior art, its object is to increase the recording capacity of a recording medium.

To achieve this, in this invention, a data recording medium with one or more data recording tracks divided into a plurality of sectors, includes an identification recording region, arranged at the beginning of each individual sector, for recording a sector identification, a servo control signal recording region, arranged next to and downstream from the identification recording region, for recording and playing back data and a data region arranged next to and downstream from the servo control signal recording region for recording data.

Also, a recording/playback apparatus for recording data to and playing back data from a recording medium having one or more tracks for recording data divided into a plurality of sectors, each with sector identification information recorded at the beginning, and a servo control signal recorded after the sector identification information, comprises recording/playback means for recording data to and playing back data from the data recording medium, identification determining means for determining the identification information in data played back and outputted from the data recording medium by the recording/playback means, and position control means for reading out the servo control signal following the identification information while the identification determining means is determining the identification information.

This invention also has a data recording medium with data regions for recording data and servo regions for recording a servo control signal, the data and servo regions being alternately arranged on one or more tracks, wherein a seek control signal for a seek operation is recorded in the servo region before the servo control signal necessary during recording and playing back of the data.

Further, a data recording medium with data regions for recording data and servo regions for recording a servo control signal repeatedly arranged on one or more tracks, wherein a synchronization control signal for carrying out control related to the synchronization of the data recording medium is recorded in the servo region before the servo control signal necessary during recording and playing back of the data.

Also, a recording/playback apparatus for recording data to and playing back data from a recording medium with data regions for recording data, and servo regions for recording servo control signals necessary during recording and playing back of the data, the data and servo regions being alternately arranged on one or more recording tracks, and a seek control signal for a seek operation being recorded in the servo region before the servo control signal, comprises recording/playback means for recording data to and playing back data from the data recording medium, position control means for controlling the position of the recording/playback means in accordance with a signal detected in the data played back from the data recording medium outputted by the recording/playback means, wherein the position control means detects the servo control signal necessary during recording/playback of data, and controls the position in accordance with this detection result when data is being recorded or played back, and detects the seek control signal and controls the position in accordance with this detection result.

Also, in this invention a recording/playback apparatus for recording data to and playing back data from a recording medium with data regions for recording data, and servo regions for recording servo control signals necessary during recording and playing back of the data, the data and servo regions being alternately arranged on one or more recording tracks, and a synchronization control signal for carrying out control related to synchronization of the data recording medium, the synchronization control signal being recorded in the servo region before the servo control signal, comprises recording/playback means for recording data to and playing back data from the data recording medium, control means for controlling the synchronization in accordance with a signal detected in the data played back from the data recording medium outputted by the recording/playback means, wherein the control means detects the servo control signal necessary during recording/playback of data, and controls the position in accordance with this detection result when data is being recorded or played back, and detects the synchronization control signal and synchronizes in accordance with this detection result during synchronization.

The recording head employed can be a single dual purpose head for both playing and recording, or a dedicated recording head and a dedicated playing head can be used.

DETAILED DESCRIPTION OF THE PREFERRED EMBODIMENTS

First Embodiment

Figure 1:
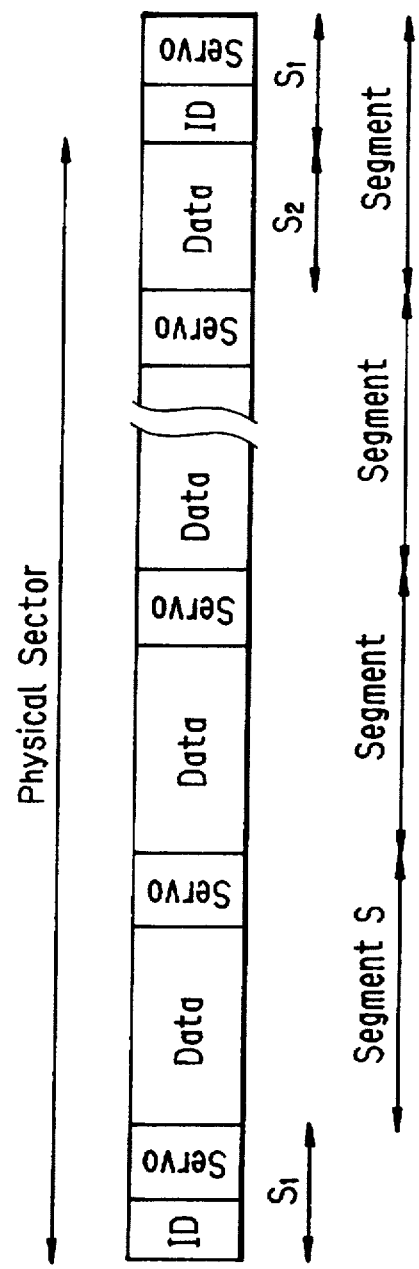
FIG. 1 is a view describing a data recording medium sector format for the present invention.
Figure 8:
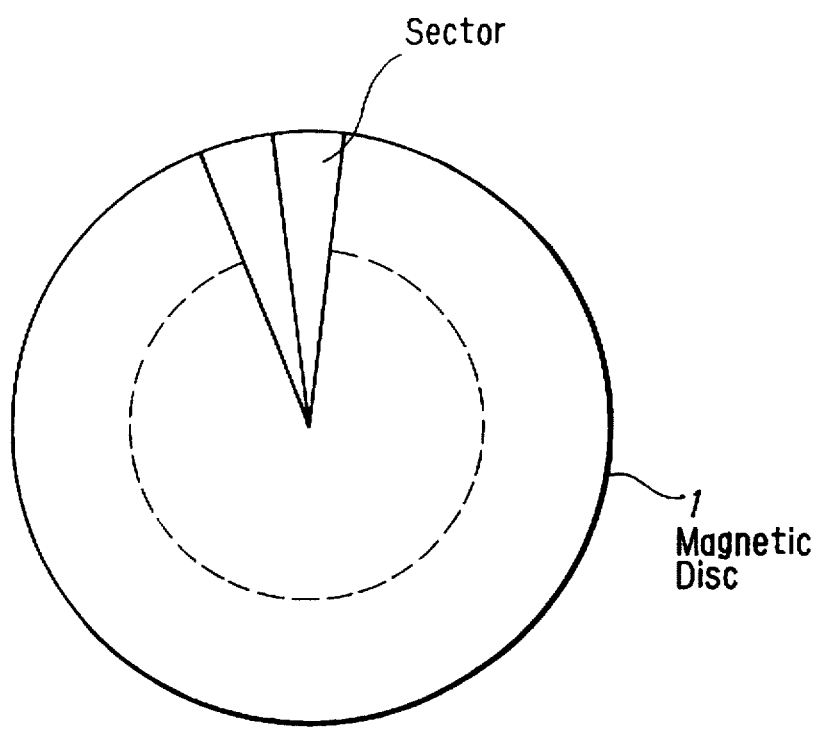
FIG. 8 is a diagram describing the format of a conventional magnetic disc.
Figure 9:
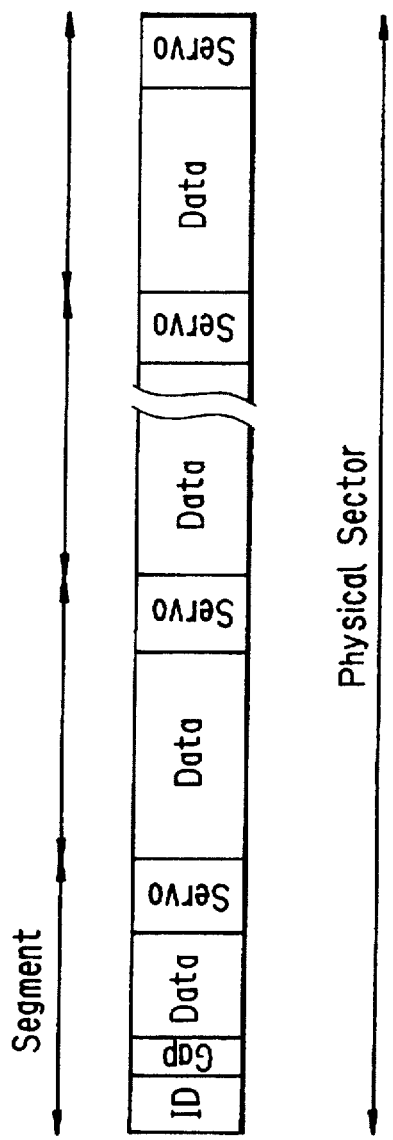
FIG. 9 is a diagram describing the sector format for a conventional magnetic disc.
Figure 10:
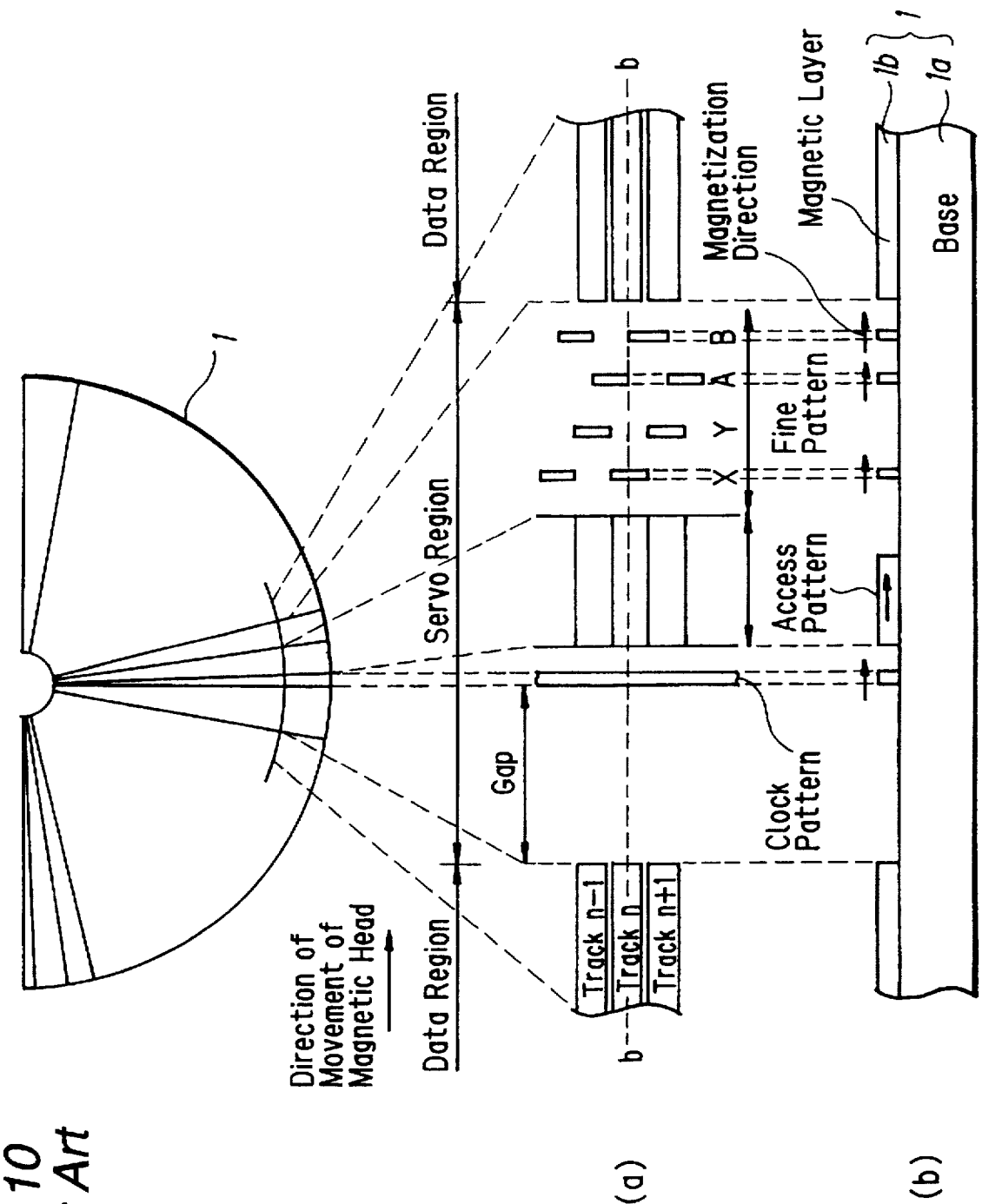
FIG. 10 is a diagram describing the servo region format for a conventional magnetic disc.

FIG. 1 is a view of a sector format for an embodiment of this invention. In this embodiment, as is the case with the magnetic disc in FIG. 8, in this embodiment the magnetic disc is divided up into a number of pie-shaped sectors, with each of these sectors being made up of a number of segments. Also, the boundary of the segments and the boundary of the sectors do not coincide.

Each segment basically consists of a data region and a servo region, with an ID region and a servo region being formed before the segment at the beginning of a group of segments. When the length of the first segment is S, and the length of the ID region and the servo region is $S_1$, a data region having a length $S_2$ equal to the difference between these two lengths (=$S-S_1$) is put at the end of the sector. By doing this, the servo region can be made to have a fixed period (for every length S) and an ID region can be arranged at the beginning of the sector.

The ID is read out from the ID region, and a period of time is then required to determine whether or not this ID coincides with the ID for the sector indicated as the sector for carrying out the recording/playing. The recording or playing back of data corresponding to the data region for this sector cannot commence until this determination process has been completed. In this embodiment, the ID determination process can be executed during this time because the ID region is formed before the servo region. It is therefore no longer necessary to have a gap following the ID region or even if a gap is included, it does not have to be made as long as that in the prior art. This means that the recording capacity of the magnetic disc can be made greater (i.e. the data region can be made longer) than that of the prior art by this portion which was formerly the gap region.

As the servo operation usually has to be executed, the ID determination result will have no effect upon it. Also, executing the servo operation before the ID determination result is outputted will not have any inconvenient effects on the servo operation.

Figure 2:
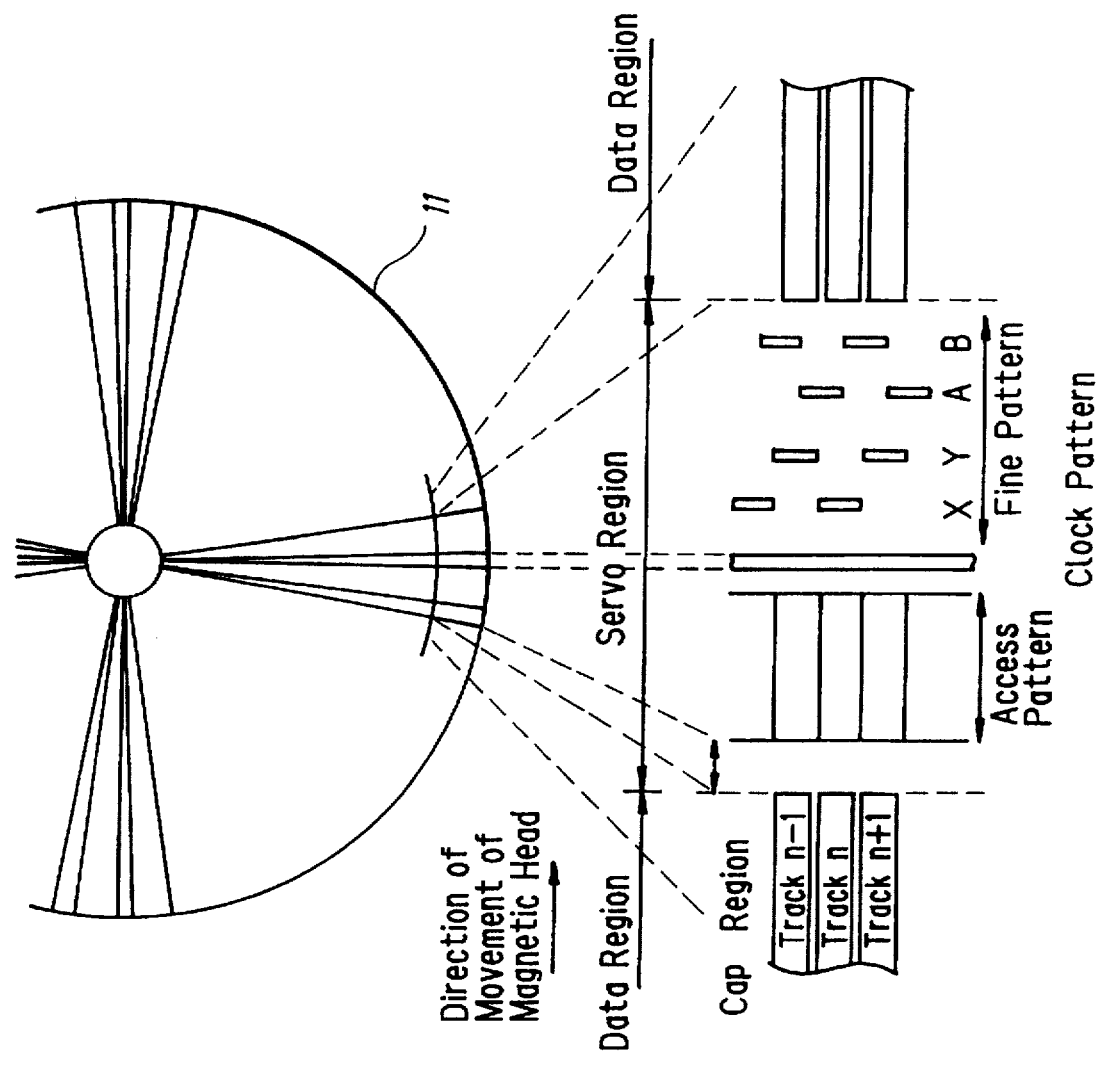
FIG. 2 is a view describing a data recording medium servo region format for the present invention.

FIG. 2 is a more detailed view of the format of the servo region in this embodiment. In this embodiment, an access pattern, a clock pattern and a fine pattern are recorded in the servo region. The access pattern is positioned at the beginning, followed by the clock pattern, which is followed finally by the fine pattern. There is also a gap region before the access pattern.

The following advantages are obtained by having this kind of format. For example, if the end of the data region is reached and recording is completed when recording data in the data region, as the next servo region has been reached, the apparatus can be switched over from the recording system to the playing system. However, data was being recorded onto the current track, so the recording mode is set and the seek operation is not executed (data recording is not carried out during the seek operation). It is not necessary to play this access pattern during recording and playback operations. The items which it is necessary to play back from the servo region during the recording and playback operations are the next clock pattern and fine pattern. The clock pattern is necessary for generating the standard clock for the recording and playback operations and the fine pattern is necessary for carrying out tracking control.

After switching over from the recording system to the playback system, a period of time is required to determine if an access pattern exists and to make sure that the playback system is in it's normal state. If the access pattern is sufficiently long, then it is not necessary to set up a gap region. If it is found during this period of time that the length of the access pattern is not sufficiently long, then a gap region equal in length to this deficiency in length can be set up. After the magnetic head has passed by this gap region and access pattern, the playback system is already in it's normal state due to the timing generated by the clock pattern. The clock pattern and fine pattern after this can therefore be played back accurately.

By arranging an access pattern which is not required during the recording and playback operations (i.e. this access pattern is only required during seek operations) before the clock pattern and fine pattern which make up the servo control signal which is necessary during the recording and playback operations, the gap region can be omitted or can be made smaller. This means that the recording capacity of the magnetic disc 11 can be increased (i.e. the data regions can be made longer) by an amount equal to what was formerly these gap regions.

Figure 3:
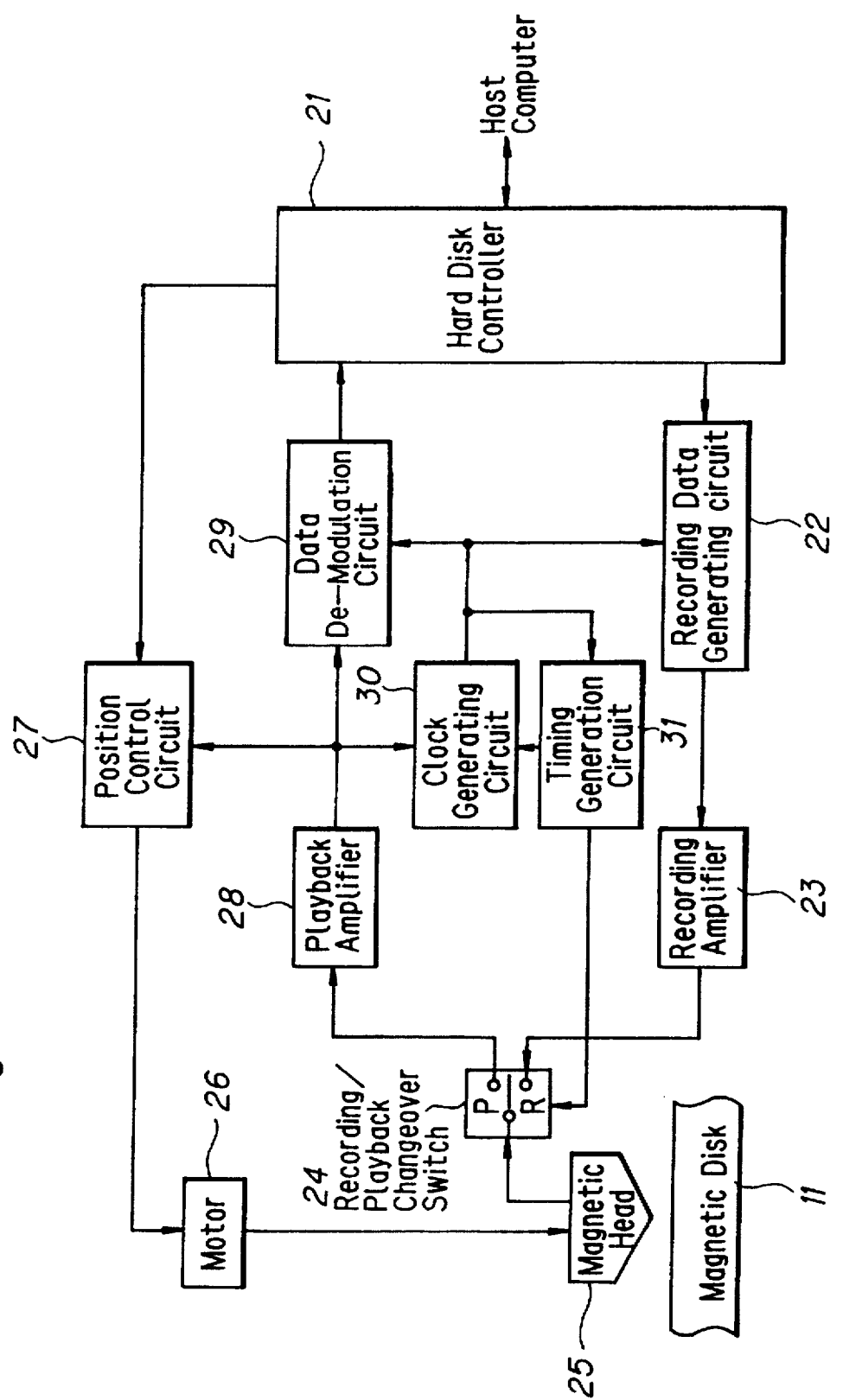
FIG. 3 is a block diagram showing the construction of a data recording medium data recording/playback apparatus for a first embodiment of the present invention.
Figure 4:
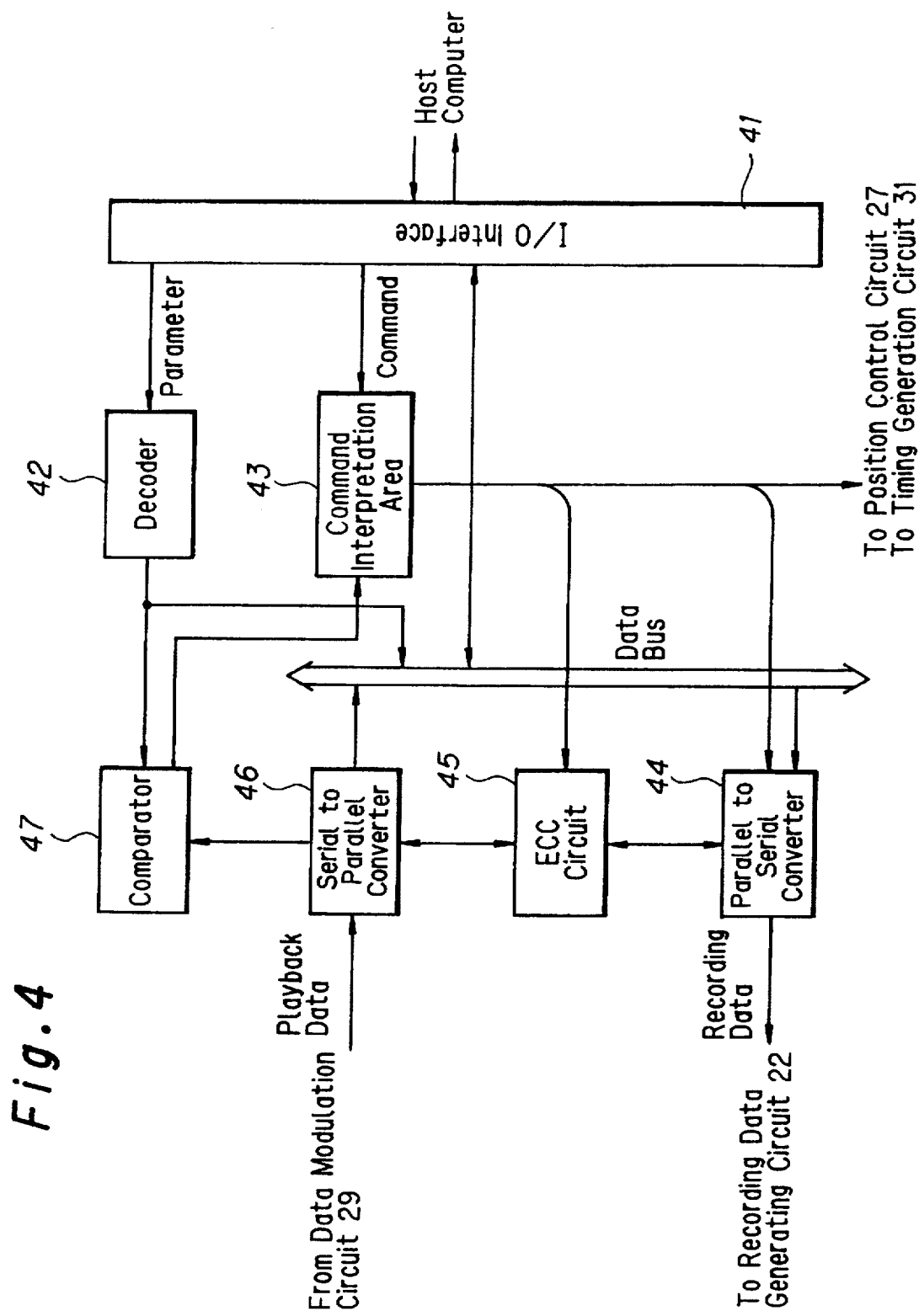
FIG. 4 is a block diagram showing the construction of the hard disc controller 21 for the first embodiment in FIG. 3.

Next, a description is given with reference to FIG. 3 and FIG. 4 of an apparatus for recording and playing back data from the kind of magnetic disc such as the magnetic disc 11. The magnetic disc 11 is formatted in the way shown in FIG. 1 and 2. A predetermined track of the magnetic disc 11 is then accessed by putting the magnetic head 25 into a predetermined position via the motor 26 and the position control circuit 27.

The hard disc controller 21 receives its data input from a host computer (not shown in the diagram) and outputs data to the recording data generating circuit 22. The recording data generating circuit then converts the inputted data into recording data which is outputted to the magnetic head 25 via the recording amplifier 23 and the connection point R of the switch 24.

The data played back from the magnetic disc 11 by the magnetic head 25 is then sent to the position control circuit 27, the data modulation circuit 29 and the clock generating circuit 30 via the connection point P of the switch 24 and the playback amplifier 28. The data modulation circuit 29 modulates the inputted data and outputs it to the hard disc controller 21. The clock generating circuit 30 generates a clock based on the data inputted to it from the playback amplifier 28, and outputs this clock to the recording data generating circuit 22, the data modulation circuit 29 and the timing generation circuit 31. The timing generation circuit then generates various timing signals using the inputted clock as a standard and sends then to the clock generating circuit 30 and the switch 24.

An example of the construction of the hard disk controller 21 is shown in FIG. 4. Data inputted from the host computer is sent through the input/output interface 41 and along the data bus to be outputted by the parallel to serial converter 44. This parallel to serial converter 44 then takes this inputted data and outputs it to the ECC circuit 45, carries out correction of detected errors, converts the parallel data to serial data and outputs it to the recording data generating circuit 22.

The data outputted by the data modulation circuit 29 is also inputted to the serial to parallel converter 46 which then outputs this playback data to the ECC circuit 45. After correction of detected errors has been carried out, this serial data is converted to parallel data before being outputted to the host computer via the data bus and the interface 41.

The command interpretation area 43 interprets commands inputted from the host computer via the interface 41, controls circuits such as the ECC circuit 45, the parallel to serial converter 44, the position control circuit 27 and the timing generation circuit 31, and carries out the processes corresponding to these commands. The decoder 42 decodes the parameters inputted from the host computer via the interface 41, and sends the results of this decoding to the comparator 47. The comparator 47 contains the playback data inputted by the serial to parallel converter 46 and, for example, compares this ID with the ID provided by the decoder 42, and outputs the results of this comparison to the command interpretation area 43.

Figure 5:
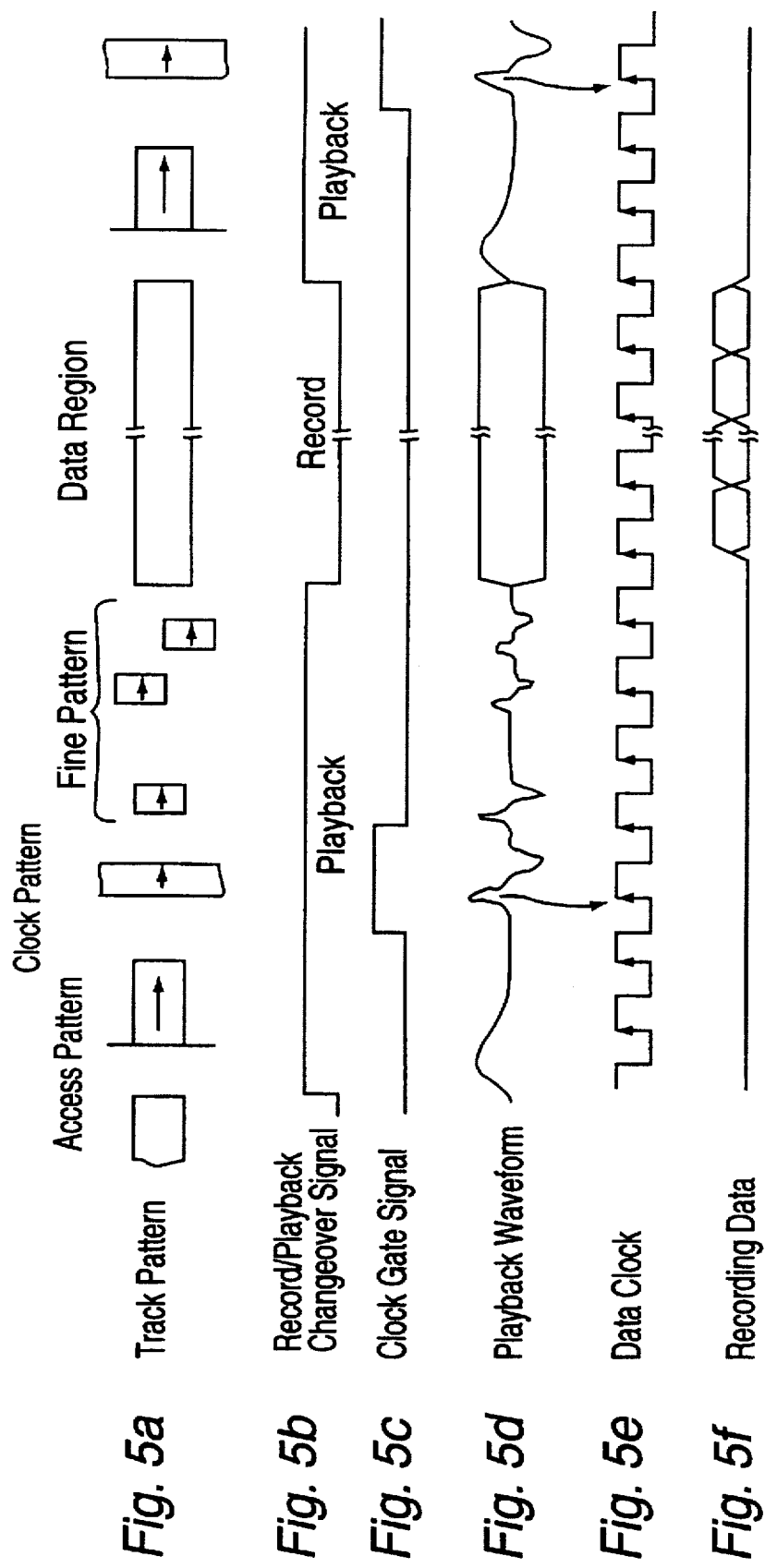
FIGS. 5(a)–(f) are timing diagram describing the operation of the embodiment shown in FIGS. 3 and 4.

Next, this operation will be described with reference to the timing diagram in FIG. 5. If, for example, an ID for a recording operation is sent to the command interpretation area 43 from the host computer via the interface 41, the command interpretation area will control each part, and the recording operation for this ID will be executed.

The magnetic head 25 outputs the signal played back from the servo region of the magnetic disc 11 (d in FIG. 5) to the playback amplifier 28 via the connection point P of the switch 24. The playback amplifier 28 then amplifies this signal inputted to it and sends it to the clock generating circuit 30. The clock generating circuit 30 then isolates the clock pattern (shown in FIG. 5 (a)) from the inputted signal (FIG. 5(d)) and then generates a clock signal (FIG. 5(e)) which is in synchronization with this isolated signal.

The timing generation circuit 31 counts this clock signal, generates a clock gate signal (FIG. 5(c)) with regards to the timing to be generated by the clock pattern of the next segment and then outputs this to the clock generating circuit 30. The clock generating circuit then, with regards to the timing of this clock gate signal, repeats this detection operation as the playback signal provided by the playback amplifier 28 corresponds to this clock pattern. In this way, a clock signal (FIG. 5(e)) which is in synchronization with the clock pattern can be provided by the clock generating circuit 30.

The timing generation circuit 31 counts this clock, and generates a changeover signal (FIG. 5(b)) where the timing for the data region is assigned a low logic level (L) and the timing for the servo region is assigned a high logic level (H) and then sends this signal to the switch 24. When this changeover signal has a low logic level (i.e. during the data region timing) the switch 24 is set to the side of connection point R and when this changeover signal has a high logic level (i.e. during the servo region timing) the switch 24 is set to the side of connection point P.

The timing generation circuit 31 also outputs a changeover signal for changing over the switch 24 to the connection point P side in accordance with the timing for the ID regions formed at the beginning of each sector. The ID played back from the magnetic disc 11 by the magnetic head 25 is therefore sent to the data modulation circuit 29 via the connection point P of the switch 24 and the playback amplifier 28 where it is modulated. This modulated data is then sent to the serial to parallel converter 46 and the ECC circuit 45. After detected errors have been corrected, it is converted from serial to parallel data and outputted to the comparator 47.

The ID of the sector to be recorded to is then provided at the comparator 47 via the interface 41 and the decoder 42. The comparator 47 then compares the ID provided by the decoder 42 and the ID provided by the serial to parallel converter 46 and outputs the result of this comparison to the command interpretation area 43. When the output of the comparator 47 shows that the indicated ID and the played back ID coincide, the command interpretation area 43 controls each area, and carries out the recording. If the two do not coincide, then the recording process waits for a situation where the two parties do coincide.

The position control circuit 27 picks out the signal corresponding to the fine pattern (FIG. 5(a)) from the signal outputted by the playback amplifier 28 (FIG. 5(d)) and uses it to generate an error signal. The magnetic head 25 is then controlled via the motor 26 in accordance with this tracking error signal. In this way, the magnetic head 25 can accurately trace the track.

The ID inputted from the host computer via the interface 41 is inputted to the parallel to serial converter 44 where it is converted from parallel to serial data. After numerals have then been added to this data to correct detected errors at the ECC circuit 45, it is sent to the recording data generating circuit 22.

The recording data generating circuit 22 then converts this ID into recording data, and outputs it to the recording head 25 via the recording amplifier 23 and the connection point R of the switch 24. In this way, an ID can be recorded in the ID region at the beginning of each sector of the magnetic disc 11.

When the command interpretation area 43 is instructed that data is to be recorded, it controls each area and carries out the recording operation. i.e. at this time, data which it is intended to record is sent from the host computer to the parallel to serial converter 44 via the interface 41 and the data bus. The parallel to serial converter 44 then sends this data to the ECC circuit 45. After numbers have been added to correct any detected errors, the data is converted from parallel data to serial data before being outputted to the recording data generating circuit 22. This recording data generating circuit 22 then converts this data to recording data by a predetermined method such as modulation and outputs it to the recording amplifier 23. The recording amplifier 23 amplifies this data before outputting it to the magnetic head 25 via the connection point R of the switch 24.

In the above way, with regards to the timing of the timing region, the recording data generated by the recording data generating circuit 22 (FIG. 5(f)) is recorded on a designated sector of a designated segment of the data region.

When the command interpretation area 43 is instructed to play data back, it controls each part, and carries out the playback operation. The timing generation circuit 31 usually changes the position of the switch 24 over to the side of the connection point P at this time. The playback signal outputted from the magnetic disc 11 by the magnetic head 25 is then outputted by the playback amplifier 28.

The command interpretation area 43, as in the case during recording, controls the position control circuit 27 in accordance with the comparison result for the comparison by the comparator 47 between the designated ID outputted from the decoder 42 and the playback ID outputted by the serial to parallel converter 46 and positions the magnetic head 25 at a predetermined sector using the motor 26. The signal outputted from the data region for the sector designated is then modulated by the data modulation circuit 29.

The playback data modulated by this data modulation circuit 29 is sent to the ECC circuit 45 via the serial to parallel converter 46. After correction of detected errors has been carried out, this data is converted from serial data to parallel data by the serial to parallel converter 46. It is then outputted to the host computer via the data bus and interface 41.

When an instruction for a seek operation is put out by the host computer, the command interpretation area 43 controls the position control circuit 27 and shifts the magnetic head 25 along the radial direction of the magnetic disc 11 at high speed. The position control circuit 27 then detects the access pattern from the playback signal outputted by the playback amplifier at this time, and also detects the position of magnetic head 25 along the radial direction of the magnetic disc 11. The magnetic head 25 is then controlled via the motor 26 to ensure that this position is the predetermined position.

As this access pattern does not give the radial position of the head along the disc with great accuracy, the position may be determined with greater accuracy by using a method such as the detection of the sector ID in the same way as in the normal playback operation.

Figure 6:
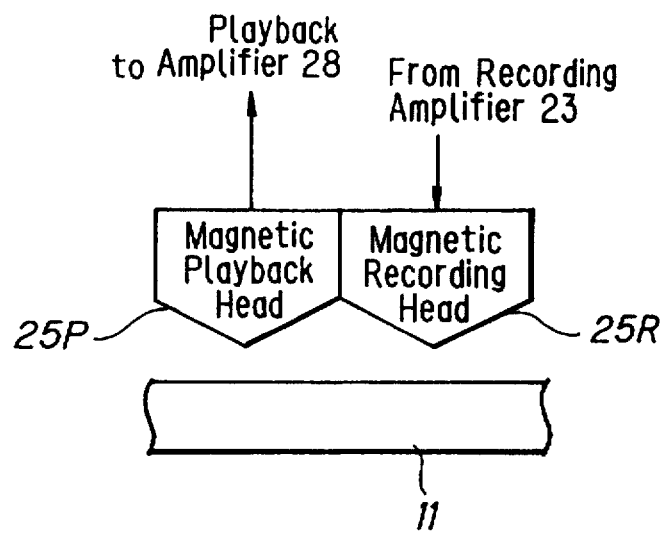
FIG. 6 is a diagram showing an example of a further construction for the magnetic head in FIG. 3.

In the above embodiment, a single dual purpose magnetic head 25 was used for both recording and playing back. However, as shown, for example, in FIG. 6, it is also possible to have two dedicated heads, such as the magnetic head 25P for playing back and the magnetic head 25R for recording. The output from the recording amplifier 23 would then be sent to the magnetic head 25R for recording, and the output from the playback amplifier 28 would then be sent to the magnetic head 25P for playing back.

Second Embodiment

Figure 7:
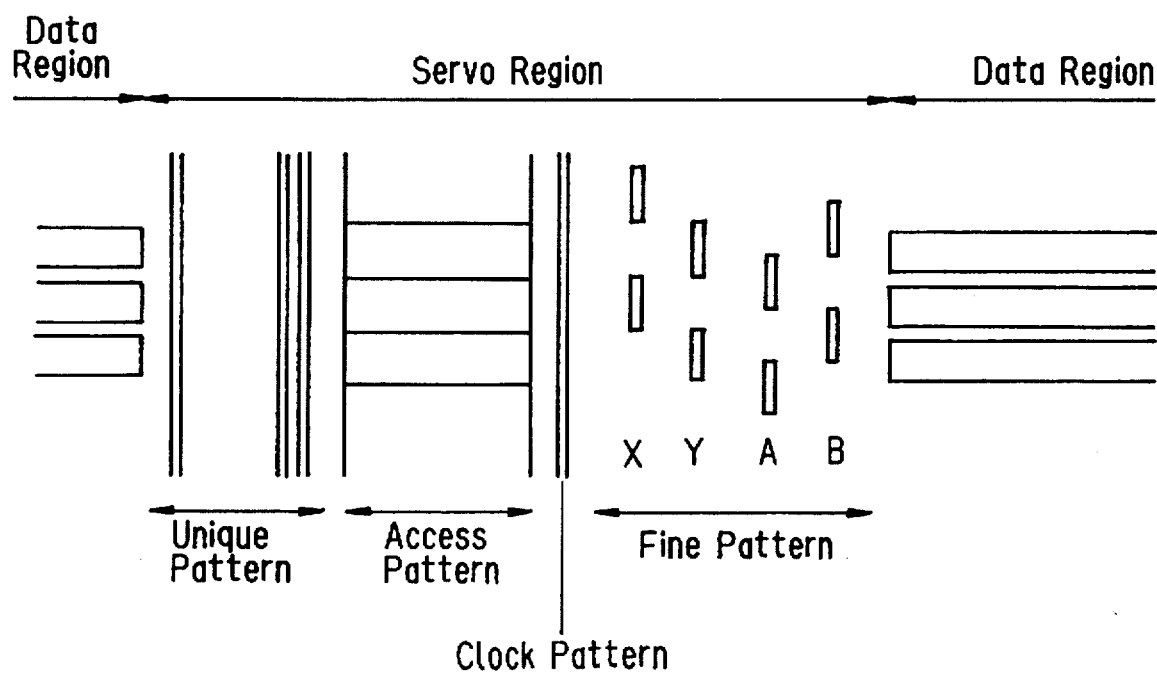
FIG. 7 is a diagram showing a format for the servo region of the data recording medium for a further embodiment of the present invention.

FIG. 7 is a view of a format for a servo region in a further embodiment of this invention. In this embodiment, an access pattern, a clock pattern and a fine pattern are recorded in the servo region in that order. A unique pattern is also recorded before the access pattern and the gap region is omitted. This unique pattern is also formed by a method such as etching, in the same way as the access pattern, clock pattern and fine pattern.

This unique pattern can be used to detect the general position of the clock pattern at times such as after the power supply has just been switched on when the disc 11 has not yet reached a constant speed of revolution. This unique pattern is made up from a number of successive radial lines (patterns) so that it can be detected even before the clock signal is being generated. As this detection of the unique pattern is now possible before the clock signal is present, the clock pattern can now be detected by generating a window at a predetermined period of time after the time of the detection of the unique pattern. The unique pattern is therefore used in this way by the clock generating circuit 30 during initial synchronization at times such as when the power supply has just been switched on.

This unique pattern is only necessary at times such as just after the power supply has been switched on up until initialization has been achieved and it is not necessary to detect this once a constant state has been reached. If this unique pattern is therefore arranged before (upstream) from the access pattern, the clock pattern and the fine pattern, the period of time between the data region finishing and the clock pattern being generated can be made longer.

In addition to this, in the case where it is wished to detect one rotation of the magnetic disc 11, a home index pattern is recorded at one place for each rotation. This home index pattern can be used to attain a state of rotational synchronization when rotational synchronization does not exist, but again is no longer necessary once a constant state has been reached (i.e. in the state where synchronization has been achieved). So, by arranging this home index pattern upstream from the clock pattern and fine pattern, the distance between the data region and the clock pattern can be made longer.

A magnetic disc has been used in the above example of the present invention, but a data recording medium such as a opto-magnetic disc or an optical disc could also be used.

According to a first aspect of this invention, since the data recording medium has an identification recording region arranged at the beginning of each individual sector for recording a sector identification, a servo control signal recording region, arranged next to and downstream from said identification recording region, for recording and playing back data; and a data region arranged next to and downstream from said servo control signal recording region for recording data, it is no longer necessary to have a gap region following the identification region, which means that the recording capacity of the data recording medium can be increased.

Also, according to a second aspect of this invention, since a recording/playback apparatus has recording/playback means for recording data to and playing back data from the data recording medium, identification determining means for determining the identification information in data played back and outputted from the data recording medium by the recording/playback means; and position control means for reading out said servo control signal following said identification information while said identification determining means is determining the identification information, it is possible to record more data on the corresponding data recording medium.

According to a third aspect of this invention, since a data recording medium with data regions for recording data and servo regions for recording a servo control signal has data and servo regions alternately arranged on one or more tracks, wherein a seek control signal for a seek operation is recorded in the servo region before the servo control signal necessary during recording and playing back of the data, it is no longer to set up a gap region, so that the capacity of the recording medium can be increased.

By using a clock pattern used in clock generation as the servo control signal, and an access pattern for regulating the position of the radial direction as the seek control signal, the recording capacity of the data recording medium can be increased.

According to a fourth aspect of this invention, since this data recording medium has a synchronization control signal for carrying out control related to the synchronization of said the recording medium is recorded in the servo region before the servo control signal necessary during recording and playing back of said data, it is no longer necessary to set up a gap region, so that the recording capacity of the data recording medium can be increased.

By making the servo control signal necessary during recording and playing back of said data a clock pattern used in clock generation, and the synchronization control signal a unique pattern for determining the rotation period of said data recording medium, it is no longer necessary to set up a gap region before the clock pattern, and the recording capacity of the data recording medium can be increased.

Also, since the servo control signal necessary during recording and playing back of said data is a clock pattern used in clock generation, and the synchronization control signal is a home index pattern for determining the position of the direction of rotation of the data recording medium, it is no longer necessary to set up a gap region before the clock pattern, and the recording capacity of the data recording medium can be increased.

Further, according to a fifth aspect of this invention, as a recording playback apparatus with a seek control signal for a seek control operation being recorded in said servo region before the servo control signal is further made up of position control means for controlling the position of the recording/ playback means in accordance with a signal detected in the data played back from the data recording medium outputted by said recording/playback means, wherein the position control means detects the servo control signal necessary during recording/playback of data, and controls said position in accordance with this detection result when data is being recorded or played back, and detects the seek control signal and controls the position in accordance with this detection result, a servo control signal necessary during recording and playback can be detected.

Moreover, according to a sixth aspect of this invention, as a recording playback apparatus with a synchronization control signal for carrying out control related to synchronization of the data recording medium, the synchronization control signal being recorded in the servo region before the servo control signal, further includes control means for controlling said synchronization in accordance with a signal detected in the data played back from said data recording medium outputted by said recording/playback means, a servo control signal necessary during recording and playback can be detected.

Also, by having a recording/playback head for both recording and playing back, a simple construction can be achieved.

Further, by having a head exclusively for recording and a further head exclusively for playing back, simple control can be achieved.

What is claimed is:

1. A disc apparatus including a data recording medium with one or more data recording tracks divided into a plurality of sectors, each sector including a servo control signal necessary during recording and playing back data, said disc apparatus comprising:

recording/playback means for recording data to and playing back data from said data recording medium;

identification determining means for determining the identification information in data played back and outputted from said data recording medium by said recording/playack means;

position control means for reading out said servo control signal necessary during recording and playing back data;

said data recording medium comprising:

an identification recording region, arranged at the beginning of each individual sector, for recording a sector identification;

a servo control signal recording region, arranged next to and downstream from said identification recording region, for recording said servo control signal necessary during recording and playing back data, wherein said identification recording region and said servo control signal recording region form a second length;

a data region arranged next to and downstream from said servo control signal recording region for recording data wherein said data recording medium is disc shaped with said data region and said servo control signal recording region making up a first segment having a first length and;

a final data region having a third length equal to said second length subtracted from said first length, wherein said final data region is arranged next to and downstream from said data region and wherein the arrangement of said identification recording region, said servo control signal recording region, said data region and said final data region enables an identification operation to be performed by said identification determining means simultaneously with a servo operation performed by said position control means.

2. A recording/playback apparatus for recording data to and playing back data from a recording medium having one or more tracks for recording data divided into a plurality of sectors, each with sector identification information recorded at the beginning, and a servo control signal recorded after the sector identification information, said apparatus comprising:

recording/playback means for recording data to and playing back data from the data recording medium;

identification determining means for determining the identification information in data played back and outputted from the data recording medium by said recording/playback means; and position control means for reading out said servo control signal following said identification information while said identification determining means is determining the identification information.

3. A disc apparatus including a data recording medium with one or more data recording tracks divided into a plurality of sectors, each sector including a servo control signal said disc apparatus comprising:

recording/playback means for recording data to and playing back data from said data recording medium;

identification determining means for determining the identification information in data played back and outputted from said data recording medium by said recording/playback means;

position control means for reading out said servo control signal;

said data recording medium comprising:

an identification recording region, arranged at the beginning of each individual sector, for recording a sector identification;

a servo control signal recording region, arranged next to and downstream from said identification recording region, for recording and playing back data and for recording said servo control signal;

a data region arranged next to and downstream from said servo control signal recording region for recording data wherein the arrangement of said identification recording region, said servo control signal recording region and said data region enables an identification operation to be performed by said identification determining means simultaneously with a servo operation performed by said position control means; and a seek control signal for a seek operation recorded in said servo control signal recording region before said servo control signal.

\* \* \* \* \*